United States Patent [19]

Krasnow

[11] 4,019,987
[45] Apr. 26, 1977

[54] EXTENDED AREA FILTERS

[76] Inventor: Leonard L. Krasnow, 293 Turnpike Road, Westboro, Mass. 01581

[22] Filed: Jan. 14, 1976

[21] Appl. No.: 649,052

[52] U.S. Cl. .................... 210/232; 210/DIG. 15; 210/483; 210/499; 425/199
[51] Int. Cl.² ..................................... B01D 29/00
[58] Field of Search .......... 210/232, 391, 439, 446, 210/447, 409, 483, 486, 487, 488, 489, 493, 497, 498, 499; 425/197, 198, 199, 192

[56] References Cited

UNITED STATES PATENTS

| | | | |
|---|---|---|---|
| 2,878,512 | 3/1959 | Davis | 425/199 |
| 2,923,972 | 2/1960 | DeGhetto | 425/199 X |
| 3,112,525 | 12/1963 | Mozlek | 425/199 X |
| 3,210,229 | 10/1965 | Leine | 210/489 X |
| 3,263,819 | 8/1966 | Schmidt et al. | 210/488 X |
| 3,620,375 | 11/1971 | Atkins | 210/484 |
| 3,728,061 | 4/1973 | Mott | 210/489 |
| 3,746,642 | 7/1973 | Bergstram | 210/496 |
| 3,811,659 | 5/1974 | Taylor et al. | 210/489 |
| 3,817,377 | 6/1974 | Piggott | 210/409 X |
| 3,947,361 | 3/1976 | Jackson | 210/391 |

*Primary Examiner*—Theodore A. Granger
*Attorney, Agent, or Firm*—Alfred H. Rosen; Frank A. Steinhilper

[57] ABSTRACT

An extended-area filter for filtering plastic stock at high pressures has a breaker plate with an undulating surface confronting the oncoming stock which substantially doubles the available filter area. Screen packs having fixed therein the same surface configuration are supported uniformly on the undulating surface against collapse under the operating pressure.

11 Claims, 10 Drawing Figures

EXTENDED AREA FILTERS

BACKGROUND OF THE INVENTION

In the manufacture of articles from rubbery, viscoelastic and plastics working materials, sometimes called "plastic stock", it is common practice to filter the working materials. This may be done in a reclaiming process, to prepare re-claimed materials for use in a product; it may also be done, for example, in an extrusion apparatus, to make certain that no foreign matter will be introduced into an extrusion die. Strainers and filters for such working materials are known in many forms, perhaps an earliest one of which is the slide-plate filter shown in U.S. Pat. No. 642,814 issued to Cowen in 1900. Slide plate filters according to Cowen are still in use today. Other forms of flat plate filters which like Cowan's are intended to be used athwart an oncoming stream of plastic stock are shown in Garrahan's U.S. Pat. No. 1,195,576; Schneider et al. U.S. Pat. No. 2,607,954; Paquette 3,797,665 and Davis 2,878,512. These are by no means exhaustive of the prior art of such filters, but they do illustrate a property which is common to them, namely, that the breaker plate generally has a flat surface for receiving oncoming stock, and the area of filter surface which is presented across the stream of plastic stock to be filtered is essentially the same as a right-cross-section of that stream.

It is common practice to use filters of the type described in apparatus by which the plastic stock is pressurized; in some such apparatus the pressure applied may reach 10,000 pounds per square inch or more. Taylor et al U.S. Pat. No. 3,811,659 proposes arched strainer plates to prevent bulging and to contribute strength.

Plated-screen filters have been used with relatively low-viscosity liquids, to increase the effective filter area presented to a flow of the material being filtered. Examples of pleated-screen filters are shown in U.S. Pat. Nos. of Rosaen 3,471,023; and Brown 3,747,772. As will be seen in those patents the pleated screens are supported by a breaker plate only at an array of points constituting a minor fraction of the total screen area, with the result that an attempt to use them to filter a plastic stock under sufficient pressure to force the stock through the screen would quickly crush the screen against the breaker plate, and effectively destroy its usefulness.

BRIEF DESCRIPTION OF THE INVENTION

In the present invention an extended-area filter is based on a breaker plate which is intended to be installed in an apparatus that includes means defining a passage through which a stream of plastic stock is forced to flow under pressure. The breaker plate will be installed across that passage, substantially in a cross-section that is perpendicular to the direction of flow. The front surface of the breaker plate which confronts the incoming flow of plastic stock has an undulating shape such that its area is substantially extended relative to the area of the cross-section of the passage in which the plate is installed. The undulating surface can take a wide variety of configurations which will extend the effective filter area about two times that of a flat surface occupying the same cross-section. Each breaker plate may be fitted with a screen pack having fixed in it the same configuration as the front surface of the breaker plate, so that the screen pack will be supported throughout its extended area by the breaker plate, against the pressure of the plastic stock to be filtered, and will not collapse under that pressure. Back-up plates can be used in the usual way with the novel extended-area filters of the invention.

The new extended-area filters, including back-up plates used with them, can be shaped flat, or can be given a primarily arched or domed configuration, as in the above-mentioned Pat. No. 3,811,659, to contribute strength to the plates, and in such instances the undulating configuration of the front surface of the breaker plate will be added to the arched or domed curve of the plate as it appears on the front surface. It will be readily apparent that the arched or domed shape of the breaker plate contributes strength to the plate, but relatively little increase to the area of the front surface of the plate, and that the present invention is independent of the primary shape of the underlying breaker plate structure.

DETAILED DESCRIPTION OF THE DRAWINGS

Figure 1:
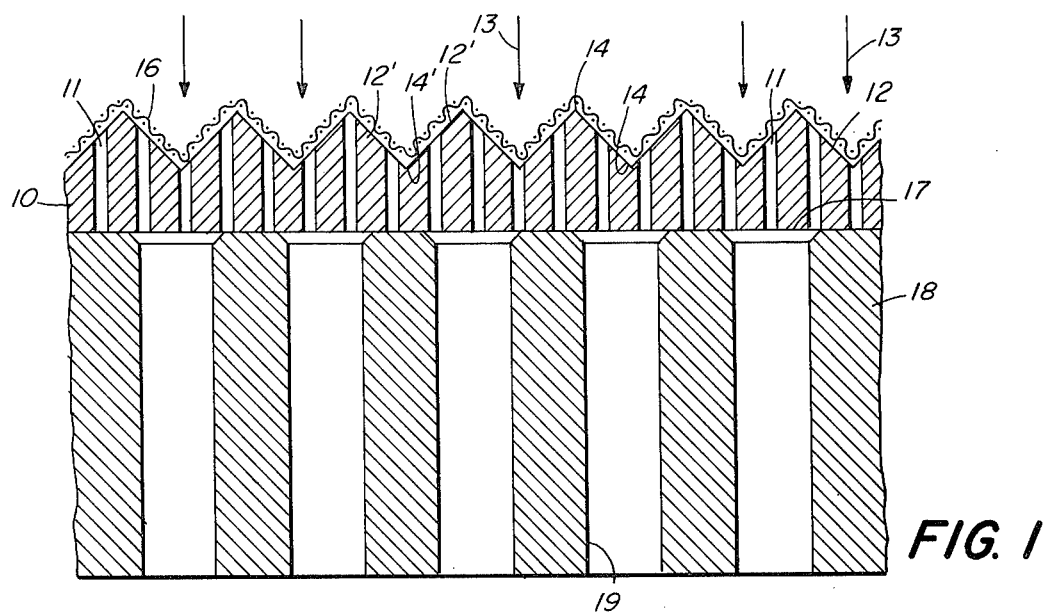
FIG. 1 is a partial view in section of an extended-area filter according to the invention.

In FIG. 1 a strainer, or breaker, plate 10 has a plurality of holes 11 through it. The front surface 12 which is intended during operation to confront fluid material to be filtered (not shown) approaching in the direction represented by arrows 13 is corrugated in a pattern of pleats made up of adjacent surface portions 12' which meet at angles 14 that are preferably about 60°. With the front surface 12 pleated at 60° angles, the total area of this surface is substantially two (2) times the area that this surface 12 would have if it were plane. A similar increase or extension in the effective area of the front surface can be achieved with a corrugated pattern (not shown) that does not involve sharp meeting angles. It will be obvious that other angles may be used, however I presently regard 60° angles as optimum for the purpose of filtering plastic stock under high pressures, such as up to 10,000 psi.

A screen 16 is fitted on the front surface 12 of the breaker plate 10. The screen is preferably made of a material, such as wire cloth, which can retain a shape, and it is given a pleated or corrugated shape corresponding to that of the front surface 12. Thus, the screen 16 is in contact substantially uniformly throughout its area with the front surface 12 of the plate 10. The plate 10 is therefore able to support the screen 16 against the pressure of oncoming fluid material, so that the screen will not be crushed out of its pleated-shape configuration, and the increased effective filter area will be preserved. This contrasts with the pleated filter construction shown in the above-referenced patent to Rosaen, where the only support that is given to the screen is at discrete points which aggregate to a very minor portion of its total projected plane area. Obviously, the screen 16 is representative of filter packs made up of two or more screens of varying opening or mesh sizes, according to the known art. Such known filter packs can be treated to increase the effective filter area according to the present invention.

The holes 11 extend through the breaker plate 10 and through the front surface 12, a shown in FIG. 1. Also as shown, a back-up plate 18 may be used adjacent the downstream side 17 of the breaker plate 10, to contribute strength, and the backup plate will preferably have a plurality of holes 19 through it which are larger in cross-sectional area than the holes 11 in the breaker plate.

Figure 2:
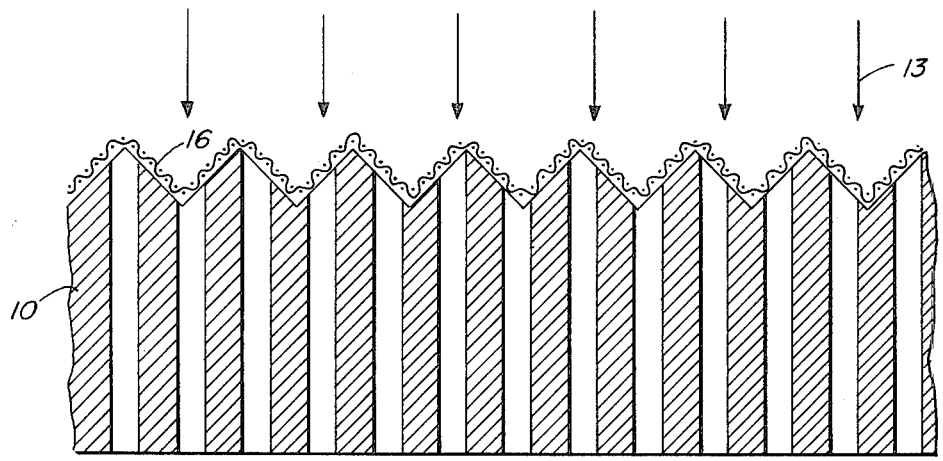
FIG. 2 is a partial view in section of another extended-area filter according to the invention.

FIG. 2 illustrates an embodiment of the invention like FIG. 1, but without a back-up plate, in which the breaker plate 10 is thickened to provide desired strength.

Figure 3:
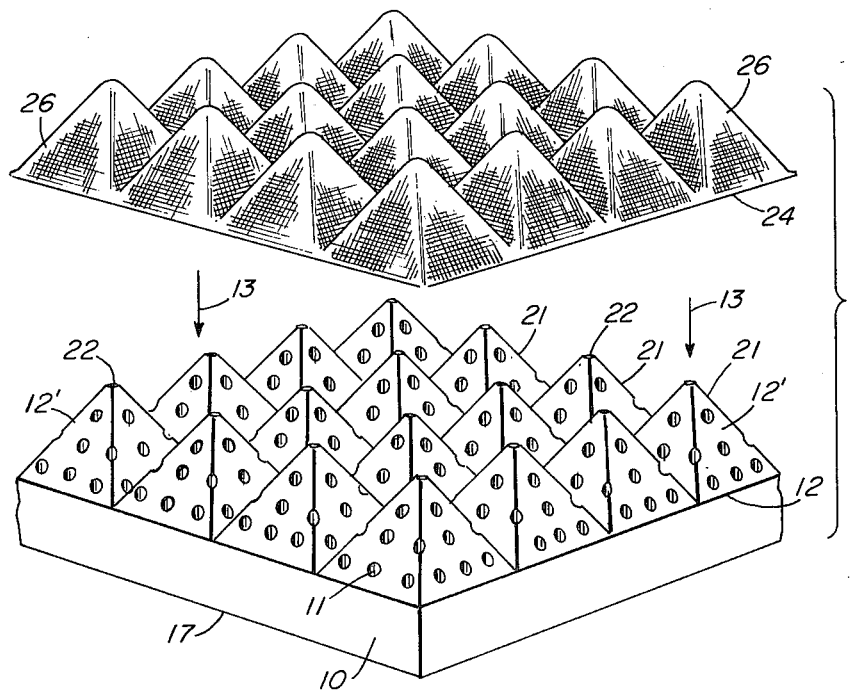
FIG. 3 is an exploded isometric view of another extended-area filter incorporating the basic structural relations illustrated in FIG. 2.

The effective filter area 12 of a strainer or breaker plate can be still further increased by providing undulating surface patterns in a plurality of directions across that area, as is illustrated in FIG. 3, where a two-dimensional pattern of pleats like those shown in FIG. 1 produces an array of pyramid-shaped projections 21 on the front surface 12 of the plate 10. The holes 11 extend through the front surfaces 12' of the pyramids. The apices 22 of the pyramids extend toward the oncoming flow of fluid material represented by the arrows 13. A screen 24 made of a shape-retaining material is formed, as by distortion, into a configuration of pyramid-shaped hollow projections 26 which correspond to the projections 21. Each hollow projection 26 of the screen fits at its concave side over one of the solid projections 21 on the plate 10, and during intended operation as a filter confronts the oncoming flow of fluid material (not shown) at its convex side. The convex side of each hollow projection 26 is made up of four triangular panels that provide filter area on rectangular base of the pyramid. The solid projections 21 support the hollow projections 26 of the screen 24 against the pressure of the fluid material to be filtered, so that hollow screen projections do not collapse under that pressure, and the advantage of increased filter area is preserved. It will be appreciated that, as in FIGS. 1 and 2, the more complexly pleated screen 24 in the filter of FIG. 3 is supported substantially throughout its area by the projections 21 on the breaker plate 10.

Figure 4:
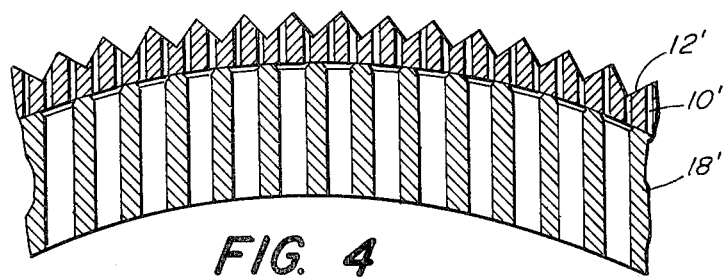
FIG. 4 illustrates an extended-area filter according to FIG. 1 in a domed configuration.

Filters according to the invention need not be basically flat as shown in FIG. 1. The entire filter assembly, whether according to FIG. 1 or FIG. 2, can be given a dome-like shape as is illustrated in FIG. 4, for added physical strength, if desired. In FIG. 4 a breaker plate 10' having an extended-area front surface 12' according to the invention is curved as on an arch or dome, and a back-up plate 18' is similarly curved to support it. This will be recognized as an arrangement of the invention according to FIG. 1, but the same arched or domed shape can be given to the arrangement of the invention according to FIG. 2. In any such modification of the invention, the advantages of extended-area filtration with substantially fully-supported screen packs will be provided, together with the additional physical strength that may be contributed by the arched or domed shape.

It will be appreciated that other forms of extended-area filters with substantially fully-supported screen packs may be constructed within the scope of the invention. Also, such filters may take any desired peripherial shape - FIG. 5 illustrating a round shape, and FIG. 6 a rectangular shape.

Figure 5:
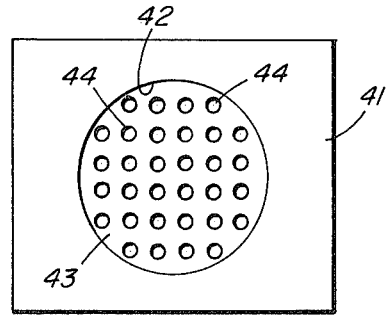
FIG. 5 illustrates a filter in a round frame.
Figure 6:
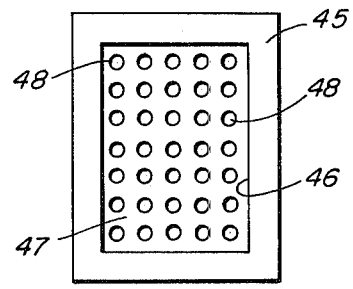
FIG. 6 illustrates a filter in a rectangular frame.

In FIG. 5, a support 41 (which may be a slide plate) has a round aperture 42 in which a breaker plate 43 with holes 44 is fitted. In FIG. 6 a support 45 has a rectangular aperture 46 in which a breaker plate 47 with holes 48 is fitted. Each of the breaker plates has an extended-area configuration according to the invention.

Figure 7:
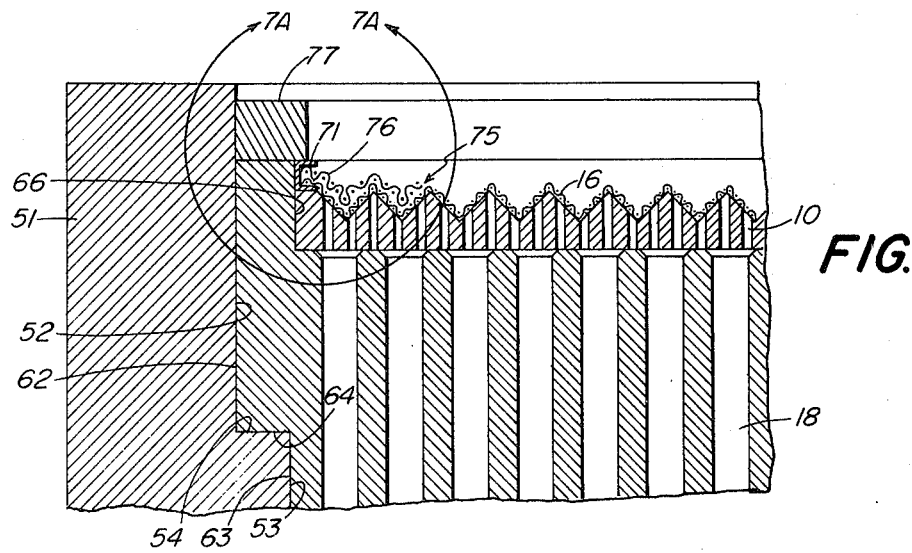
FIG. 7 illustrates an assembly of an extended-area filter and a screen pack according to the invention.
Figure 7A:
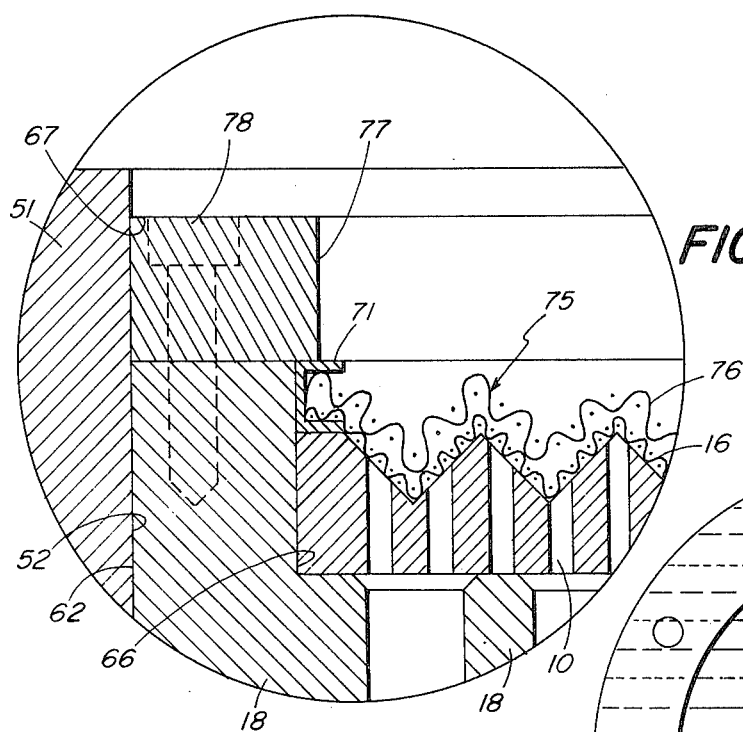
FIG. 7A is an exploded detail of FIG. 7.

In FIGS. 7 and 7A a filter according to the invention, generally as is illustrated in FIG. 1, is shown installed in a support 51, which may have an aperture 52 of any desired shape. The aperture has a portion 53 of reduced size, and a ledge 54 between the two aperture portions 52 and 53. A back-up plate 18 as in FIG. 1 is shaped at its periphery 62, 63 to fit in the aperture 52, 53, the periphery portion 62 of larger dimension being separated from the periphery portion 63 of smaller dimension by the step 64 which rests on the ledge 54 of the frame 51. Similarly, the breaker plate 10 fits in an aperture 66 in the forward side of the back-up plate 18. A screen-pack 75 which may, for example, be made of a first screen 16 as in FIG. 1 and a second screen 76 held together peripherally in a frame 71, is fitted via the frame into the aperture 66 at the front surface 12 of the breaker plate 10. The screen-pack is in this example made of two screens, which may be of relatively different mesh sizes as is known in the art, each screen having substantially permanently fixed in it the shape of the configuration of the front surface 12 of the breaker plate. To this end, at least one of the screens is made of a material, or has a property, which can retain a shape. Clearly, the screen-pack can incorporate more than two individual screens, if desired. A clamp 77 which fits into the aperture 52 in the support 51 is fastened by bolts 78 to the top surface 67 of the back-up plate 18 surrounding the aperture 66 in that plate, for holding the screen pack 75 in place. The clamp 77 may be in the form of a ring conforming to the aperture 52, or it may be made of a plurality of individual segments of such a ring which can be individually removed and installed, as may be desired by the designer.

Figure 8:
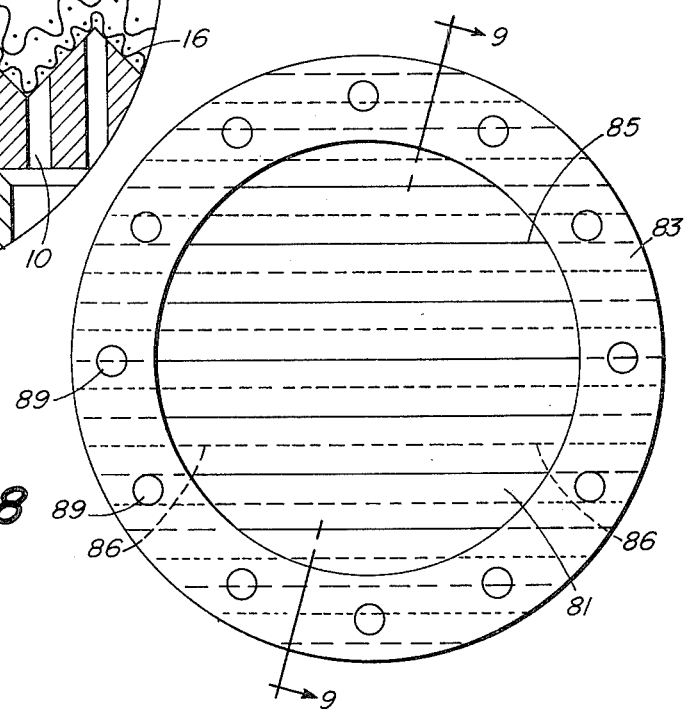
FIG. 8 shows an extended-area screen pack useful in the invention.
Figure 9:
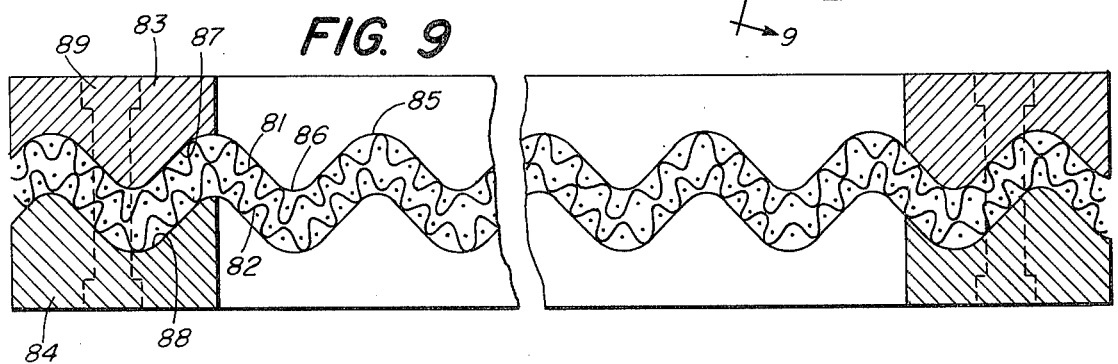
FIG. 9 is an enlarged section on line 9—9 of FIG. 8.

An improved screen pack for the invention is illustrated in FIGS. 8 and 9, where a pack of two screens 81 and 82 is peripherally clamped between two rings 83 and 84. The screens have an undulating configuration intended to conform with an undulating surface like the surface 12 of breaker plate 10 in FIG. 1. As seen in FIG. 8, the solid lines 85 within the ring 83 represent peaks of the undulation and the dotted lines 86 represent valleys between the peaks. The confronting surfaces 87, 88, respectively, of the rings 83, 84 have the same undulating configuration as the screens, and the rings are claimped together, as by bolts 89, to hold the screens between them. This form of construction facilitates large volume production of extended-area screen packs for use in the invention, in that the individual screens 81, 82 can be given the desired undulating configuration over large areas, and then smaller pieces of the screens can be assembled between the rings 83, 84 without distorting that configuration. The bolts 89 can be recessed as shown, and the assembled screen pack will fit into a support as shown in FIGS. 7 and 7A. It will be appreciated that the rings are shown out of proportion in FIGS. 8 and 9 to facilitate illustrating details of the clamping scheme, and that in practice the area within the rings, that is, the useful filter area, would be relatively larger. It will also be understood that the rings 83, 84 need not be round, but could be given any desired shape including rectangular.

I claim:

1. In an apparatus to filter a fluid material under high pressure in the range of 10,000 pounds per square inch or greater, said apparatus including means defining a passage through which said material is forced to flow under such high pressure, extended-area filter means located in the path of said flow comprising a rigid breaker plate across said passage in a principal plane which is essentially the same as a right-cross section of said flow, said plate having a rigid corrugated surface extending across said passage for confronting oncoming high pressure flow with an enlarged filter area that is substantially two times larger than the plane area of said principal plane contained within the bounds of said passage, means providing a plurality of holes through said breaker plate and said corrugated surface for passage therethrough of filtered material, screen means removably supported on said corrugated surface, said screen means comprising at least one primarily two-dimensional screen made of a shape-retaining material and having substantially permanently fixed therein a corrugated shape configuration that corresponds substantially identically to the shape-configuration of said rigid corrugated surface, said plate giving substantially uniform support throughout said enlarged filter area to said screen means against said high pressure for preventing collapse of said screen means during the intended operation of said apparatus.

2. Filter means according to claim 1 wherein said corrugated surface is a continuum of the outer surfaces of an array of three-dimensional pyramid-shaped elements supported on said breaker plate and oriented with their respective apices projecting into said oncoming flow during the intended operation of said apparatus, said holes extending from said plate through said elements.

3. Screen means for filter means according to claim 2 comprising at least one primarily two-dimensional screen made of a shape-retaining material and having substantially permanently fixed therein an array of substantially pyramid-shaped distortions which are concave on one side of said screen means and convex on the other side of said screen means, the configuration of said array of distortions substantially matching the configuration of said pyramid-shaped elements such that said screen means can be installed on said breaker plate with said pyramid-shaped elements nested one within each of said concave distortions, and when said screen means is so installed it will be in contact with said corrugated surface substantially through the area thereof, for giving substantially uniform support to said screen means against said pressure during the intended operation of said apparatus.

4. Filter means according to claim 1 including a back-up plate adjacent said breaker plate for supporting the breaker plate against said pressure, said back-up plate intended to be located downstream of said flow relative to said breaker plate when said filter means is installed in said apparatus, and means providing a plurality of holes through said back-up plate for passage therethrough of filtered material, the holes in said back-up plate having substantially larger cross-section than the holes in said breaker plate.

5. Filter means according to claim 1 comprising a curved breaker plate intended to be supported at its periphery with an intermediate portion extending into oncoming flow of said material for strengthening said plate against deformation under said pressure.

6. Filter means according to claim 5 wherein said breaker plate is curved in the shape of an arch, a dome or the like.

7. Filter means according to claim 6 wherein the periphery of said breaker plate is rectangular with length greater than width, and said plate is curved in the shape of an arch in the direction of the length dimension.

8. Filter means according to claim 6 wherein the periphery of said breaker plate is circular, and said breaker plate is curved in the shape of a dome.

9. Filter means according to claim 6 including screen means supported on said corrugated surface and substantially permanently shaped for simultaneously substantially duplicating said curved shape of said plate and said corrugated configuration so as to effect substantially uniform contact between said screen means and said corrugated surface.

10. Screen means according to claim 1 including holding means comprising first and second rings for peripherally supporting said screen means between said rings, and means clamping said screen means between said rings.

11. Screen means according to claim 10 wherein the surfaces of said rings confronting said screen means have, respectively, corresponding corrugated configurations for mating with the corrugated configuration of said screen means when the latter is clamped between them.

* * * * *